United States Patent

Smith et al.

[15] 3,699,218
[45] Oct. 17, 1972

[54] HYDROGEN MANUFACTURE

[72] Inventors: Calvin S. Smith; William J. McLeod, both of El Cerrito, Calif.

[73] Assignee: Chevron Research Company, San Francisco, Calif.

[22] Filed: June 12, 1970

[21] Appl. No.: 46,564

Related U.S. Application Data

[63] Continuation-in-part of Ser. No. 754,031, Aug. 20, 1968, abandoned, which is a continuation-in-part of Ser. No. 736,520, May 17, 1968, Pat. No. 3,618,331, and a continuation-in-part of Ser. No. 665,106, Sept. 1, 1967, abandoned.

[52] U.S. Cl. ..................423/648, 423/437, 423/415, 55/68
[51] Int. Cl...........C01b 1/02, C01b 1/26, C01b 1/32
[58] Field of Search .23/213, 212, 210, 204 CO, 150; 55/68; 252/373

[56] References Cited

UNITED STATES PATENTS

| | | | |
|---|---|---|---|
| 2,882,243 | 4/1959 | Milton | 252/455 |
| 2,882,244 | 4/1959 | Milton | 252/455 |
| 3,011,589 | 12/1961 | Meyer | 55/68 X |
| 3,251,652 | 5/1966 | Pfefferle | 23/213 |
| 3,266,219 | 8/1966 | Woertz | 55/68 X |
| 3,271,110 | 9/1966 | Bratler | 23/213 |
| 3,361,534 | 1/1968 | Johnson et al. | 23/213 X |
| 3,377,138 | 4/1968 | Gutmann et al. | 23/213 |
| 3,401,111 | 9/1968 | Jackson | 23/210 X |
| 3,463,603 | 8/1969 | Freitas et al. | 55/68 X |

Primary Examiner—Edward Stern
Attorney—J. A. Buchanan, Jr., G. F. Magdeburger, R. H. Davies and T. G. De Jonghe

[57] ABSTRACT

Process for obtaining high purity, high pressure hydrogen wherein hydrogen-rich gas containing carbon dioxide and carbon monoxide is centrifugally compressed to high pressure, the carbon dioxide is then removed from the high pressure hydrogen-rich gas by absorption at low temperature to obtain a high pressure, low temperature hydrogen-rich gas containing carbon monoxide and then the carbon monoxide is removed from the hydrogen-rich gas by adsorption at low temperature and high pressure.

5 Claims, 1 Drawing Figure

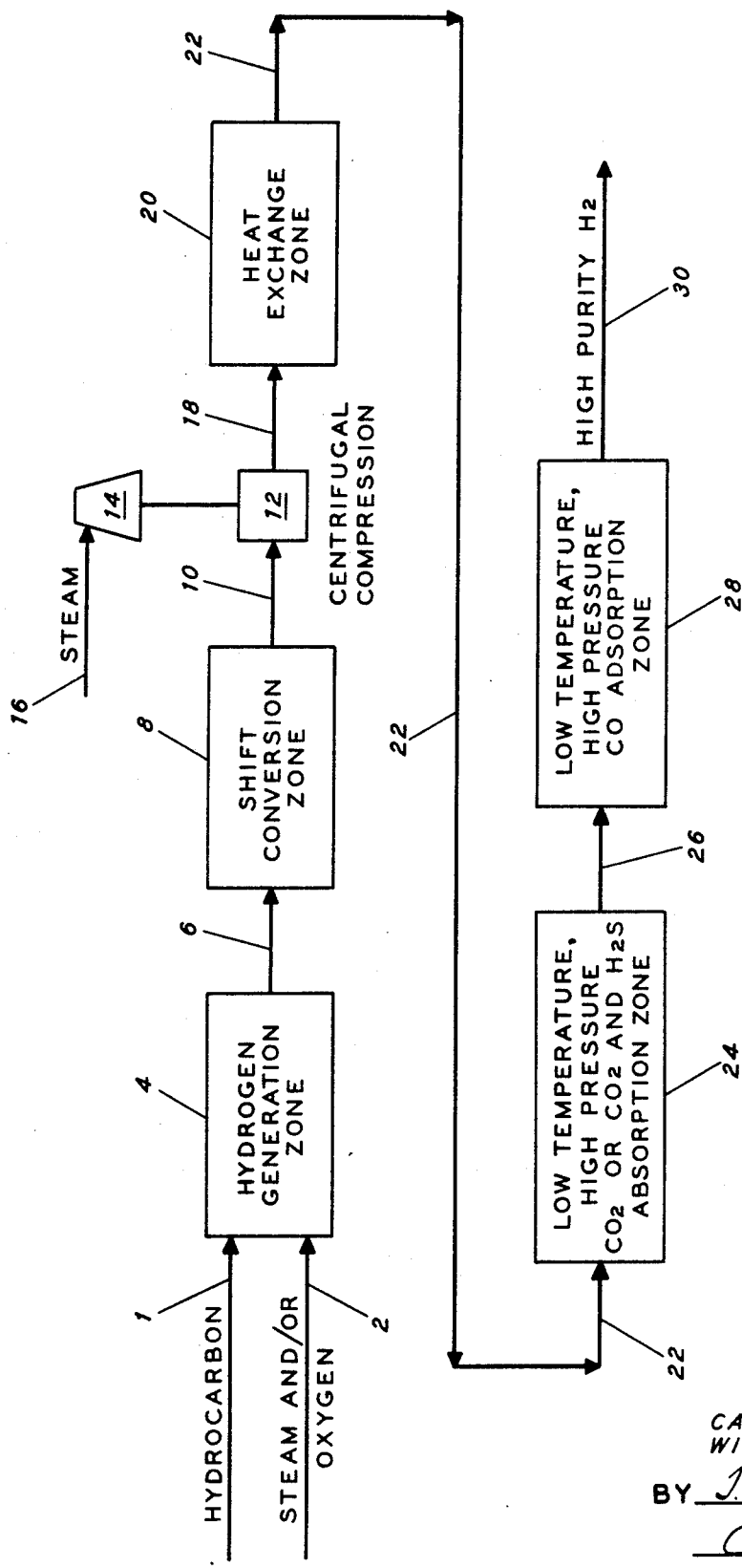

HYDROGEN MANUFACTURE

CROSS REFERENCES

This application is a continuation-in-part of our application Ser. No. 754,031, filed Aug. 20, 1968, now abandoned which, in turn, is a continuation-in-part of our application Ser. No. 736,520, filed May 17, 1968 now U.S. Pat. No. 3,618,331, which, in turn, is a continuation-in-part of our application U.S. Ser. No. 665,106, filed Sept. 1, 1967, now abandoned.

BACKGROUND OF THE INVENTION

1. Field of the Invention

This invention relates to processes for the production, compression and purification of gases; and, more particularly, it relates to a process which supplies hydrogen-rich gas at elevated pressure. In a still more particular aspect, the invention relates to a process for obtaining high purity, high pressure hydrogen for use in a hydroconversion process.

2. Description of the Prior Art

Our earlier applications, Ser. Nos. 736,520 (now U.S. Pat. No. 3,618,331) and 665,106 (now abandoned), describe much of the prior art pertinent to this invention; and the entire disclosures of the above applications are incorporated by reference into this application.

In general, the steps of hydrogen producing processes according to the prior art are basically:

1. steam-light hydrocarbon reforming, or hydrocarbon partial oxidation to generate a raw, hydrogen-rich gas containing carbon dioxide and carbon monoxide;

2. shift conversion of the carbon monoxide with $H_2O$ to produce hydrogen and carbon dioxide;

3. removal of the carbon dioxide using an absorbent such as monoethanolamine or potassium carbonate;

4. removal of carbon monoxide by catalytic methanation of the carbon monoxide to form methane; methane generally being a less detrimental impurity than is carbon monoxide. Alternatively, the carbon monoxide is removed at relatively high pressure (thus calling for an intermediate compression step after carbon dioxide removal) by a copper liquor absorbent; and 5. compression of the purified hydrogen to high pressures, for example, 1,500 to 5,000 psig, for use in a hydroconversion process such as hydrofining or hydrocracking.

In the methanation reaction, 3 mols of hydrogen are used up for every mol of carbon monoxide converted to methane. The reaction is as follows:

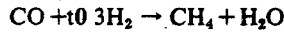
$CO + t0\ 3H_2 \rightarrow CH_4 + H_2O$

An obvious disadvantage of the use of methanation is the fact that methane is formed, thus reducing the purity of the hydrogen product. This reduced purity is very expensive from an overall standpoint because it results in higher total pressures being required in the hydroconversion zone to obtain a given hydrogen partial pressure. The methane impurity also results in greater quantities of gas being recirculated by the recycle compressors for the hydroconversion process. In addition, the methanator reactor itself and associated equipment are expensive; and the catalyst is expensive.

Use of the copper liquor system would appear to be an answer to the impurity problem caused by methanation. But the copper liquor system suffers from the disadvantage of being an extremely expensive system for removing carbon monoxide from hydrogen. The copper liquor system requires an absorber and a stripper and the use of a solvent (generally cupric/cuprous ammonium acetate) which is expensive to make up and difficult to maintain in proper condition to avoid carbon monoxide breakthrough from the carbon monoxide absorber.

SUMMARY OF THE INVENTION

According to the present invention, a process is provided for obtaining high pressure, high purity hydrogen which comprises: (a) generating a hydrogen-rich gas comprising hydrogen, carbon dioxide and carbon monoxide and containing sufficient carbon dioxide so that the molecular weight of the hydrogen-rich gas is at least four, (b) centrifugally compressing the hydrogen-rich gas to a pressure above 900 psig to obtain high pressure hydrogen-rich gas, (c) removing carbon dioxide from the high pressure hydrogen-rich gas by low temperature absorption of carbon dioxide into a methanol absorbent to obtain low-temperature hydrogen-rich carbon dioxide-lean gas at a temperature between minus 100° F. and 32° F., and (d) removing carbon monoxide from the low temperature hydrogen-rich gas by adsorption of carbon monoxide at a temperature below 0° F. to obtain high purity hydrogen gas.

The present invention has many advantages. For example, in the process combination of the present invention, low temperature, high pressure, hydrogen-rich gas containing carbon monoxide is economically produced, which low temperature and high pressure of the hydrogen-rich gas results in relatively easy removal of the carbon monoxide by adsorption. Also, the adsorption step results in product hydrogen of substantially higher purity than product hydrogen obtained in accordance with prior processes.

The hydrogen-rich gas comprising hydrogen, carbon dioxide and carbon monoxide and having a molecular weight of at least four, can be generated in various manners, for example, the hydrogen-rich gas can be generated by steam-light hydrocarbon reforming or by partial oxidation of hydrocarbons or other carbonaceous matter. However, it is preferred in the process of the present invention to employ steam-light hydrocarbon reforming such as steam-methane or steam-natural gas reforming to obtain the hydrogen-rich gas. Steam reforming is preferred as a means for obtaining hydrogen-rich gas because of its usual relatively low initial investment and also operating cost for hydrogen production in the process of the present invention. Also, hydrogen produced by steam reforming almost always must be compressed if high pressure hydrogen is desired, whereas hydrogen produced by partial oxidation can be generated at an initial relatively high pressure.

As shown in the drawing which will be described hereinbelow, usually a carbon monoxide shift conversion step follows the hydrogen generation zone, but the centrifugal compression step can be prior to the carbon monoxide shift conversion step. Hydrogen generated by steam reforming will contain sufficient carbon dioxide and carbon monoxide so that the hydrogen-rich gas will have a molecular weight of at least four. The molecular weight of the hydrogen-rich gas is usually somewhat higher after carbon monoxide shift conversion and for this reason, and also because it is advantageous to effect the carbon monoxide shift conversion at a relatively low pressure, it is preferable in the process of the present invention to carry out the carbon monoxide shift conversion before centrifugal compression of the hydrogen-rich gas. Because carbon monoxide shift conversion can either precede or follow centrifugal compression of the hydrogen-rich gas, it is to be understood that the word "generating" is used in the broad sense in the present specification, particularly in the claims of the present specification, to include various processing steps or means to produce or obtain a hydrogen-rich gas which has lesser or greater amounts of carbon dioxide and carbon monoxide which, in any case, contains at least sufficient carbon dioxide so that the molecular weight of the hydrogen-rich gas which is centrifugally compressed is at least four.

The centrifugal compression step of the present invention substantially increases the pressure of the hydrogen-carbon dioxide-carbon monoxide gas mixture, i.e., the pressure is increased by at least 200 psi. Preferably, the pressure is increased by 450 psi. and still more preferably, the pressure is increased by as much as 1,000 or 1,500 psi. For example, when the raw hydrogen gas is generated by steam reforming, the pressure is advantageously raised from below about 450 psig to above about 900 psig, preferably above 1,300 psig. Presence of the carbon dioxide in the raw, hydrogen-rich gas that is passed to the centrifugal compressor not only increases the molecular weight of the gas mixture but also increases the volume of the gas mixture. Both of these factors increase the applicability of centrifugal compressors as opposed to reciprocating.

BRIEF DESCRIPTION OF THE DRAWING

The drawing shows the sequential steps employed according to the present invention to produce high purity, high pressure hydrogen.

DETAILED DESCRIPTION OF THE DRAWING

Referring now in more detail to the drawing, the hydrocarbons in line 1 and the steam and/or hydrogen in line 2 are introduced to hydrogen generation zone 4. The hydrogen generation may be accomplished by steam-light hydrocarbon reforming or by partial oxidation or by any other method resulting in production of hydrogen, carbon dioxide and carbon monoxide. A particularly advantageous embodiment of the present invention is that wherein the raw, hydrogen-rich gas is produced by partial oxidation because in partial oxidation, a relatively (compared to steam reforming) large amount of carbon dioxide and carbon monoxide is produced. Because of the large amount of carbon dioxide and carbon monoxide, even if two stages of carbon monoxide shift conversion are used, there still is a relatively large amount of carbon monoxide present which must be removed in order to produce high purity hydrogen.

The effluent gases from the hydrogen generation zone pass in line 6 to shift conversion zone 8. In shift conversion zone 8, carbon monoxide is reacted with $H_2O$ to produce carbon dioxide and hydrogen. If one stage of shift conversion is used, generally it is a high temperature shift conversion zone operating at 650° – 800° F. The shift conversion zone carbon monoxide "leakage," i.e., the amount of carbon monoxide in the hydrogen-rich gas from the shift conversion zone, is typically 2 to 4 percent in those instances where one high temperature shift converter is used. In those instances where a high temperature shift converter is followed by a low temperature shift converter, carbon monoxide leakage is reduced generally to less than 1 percent, for example, 0.5 percent. The shift conversion zone is operated at nearly the same pressure as the hydrogen generation zone which, in the case of steam reforming, means typical pressures from 100 to 300 psig and in the case of partial oxidation means typical pressures from 100 to 600 psig.

In the present invention, before complete carbon dioxide removal and generally before any $CO_2$ removal, the hydrogen-rich gas from the shift conversion zone is centrifugally compressed. As the term "centrifugal compression" is used herein, it is meant to include any type of turbocompression. Thus, referring to the drawing, effluent from the shift conversion zone in line 10 is passed through centrifugal compressor 12 and is compressed to a pressure above 900 psig, preferably to a pressure between 1,200 and 2,000 psig. The centrifugal compressor, unlike a reciprocating compressor, is amenable to drive by a turbine driver. Thus, steam produced in the process, for example, by the hot gases from the shift conversion, may be used to drive a steam turbine driver which, in turn, drives the compressor. Steam is shown as being introduced via line 16 to turbine driver 14.

According to the preferred embodiment of the present invention shown in the drawing, all of the hydrogen-rich gas from shift conversion zone 8 (which can be considered together with zone 4 as the hydrogen-rich gas generating steps according to the preferred embodiment illustrated) is passed to centrifugal compression in zone 12. Because of the 17 to 40 volume percent carbon dioxide present, along with other impurities such as carbon monoxide, the molecular weight of this hydrogen-rich gas is between about 10 and 25. Within the concept of the present invention, it is practical to lower the molecular weight of the hydrogen-rich gas to as low as about four by removing part of the carbon dioxide and then using centrifugal compressors for compression to high pressure. Thus, an alternate to the embodiment of the present invention wherein the hydrogen-rich gas is compressed before carbon dioxide removal is centrifugal compression after partial carbon dioxide removal, but before final carbon dioxide removal. A gas mixture of hydrogen and carbon dioxide containing about 5 volume percent carbon dioxide has a molecular weight of four.

The high pressure hydrogen gas from the compressor is passed via line 18 to heat exchange zone 20 wherein the gas is cooled, preferably to about 40° F. The gas may be cooled in part by cooling water. In a preferred embodiment, at least part of the heat removal is effected by expanding carbon dioxide obtained as a cold, high pressure liquid and vapor in the carbon dioxide absorption zone 24. The cool, hydrogen-rich gas containing carbon dioxide and carbon monoxide is passed via line 22 to the low temperature, high pressure carbon dioxide (or $CO_2$ and $H_2S$) absorption zone. Absorption zone 24 consists primarily of a carbon dioxide (or $CO_2$ and $H_2S$) absorber and an absorbent regenerator. Much of the cooling of the absorbent is effected by exchange of the high pressure carbon dioxide obtained as a solution with the carbon dioxide absorbent in the bottom of the carbon dioxide absorber. Preferably, methanol is used as the absorbent, and the methanol absorbent is cooled by expanding the methanol-carbon dioxide solution obtained in the bottom of the carbon dioxide absorber to obtain very low temperature, low pressure carbon dioxide and low temperature liquid methanol. The methanol is cooled to a temperature between 0° F. and minus 120° F., preferably about minus 100° F., and it is introduced to the top of the carbon dioxide absorber. The absorbent at this low temperature and high pressure readily removes carbon dioxide from the hydrogen-rich gas to produce hydrogen-rich carbon dioxide-lean gas at a temperature between 0° F. and minus 100° F., preferably about minus 80° F.

At these low temperatures, that is, between 0° F. and minus 100° F. and at the high pressure obtained via centrifugal compression, it is advantageous to remove the carbon monoxide by adsorption. Thus, the hydrogen-rich carbon dioxide-lean gas is passed via line 26 to low temperature, high pressure carbon monoxide absorption zone 28. The hydrogen-rich gas feed to carbon monoxide absorption zone 28 contains between 0.5 and 4.0 percent carbon monoxide, and the high purity, high pressure hydrogen withdrawn from carbon monoxide adsorption zone 28 contains less than 0.01 percent carbon monoxide, generally less than 0.005 percent carbon monoxide.

The advantage of the low temperature adsorption resides in part in the fact that the closer the temperature is to the boiling point of the component being adsorbed, the easier it is to adsorb the component. Thus, in the case of carbon monoxide, which has a boiling point of minus 312° F., adsorption is much more easily effected at the low temperature of the hydrogen effluent gas from zone 24 than is adsorption of carbon monoxide at ambient temperatures or temperatures obtained merely by heat exchange with cooling water. For example, using a sodium zeolite X (X is meant to designate a synthetic zeolite manufactured by Union Carbide Corporation and described in their U.S. Pat. No. 2,882,224) at 0° C. and 500 millimeters mercury, only about 4.04 weight percent carbon monoxide os absorbed, whereas at minus 100° F., 15.8 weight percent carbon monoxide is adsorbed, based on weight of the adsorbent.

Another factor favoring the carbon monoxide adsorption in the embodiment of the present invention is the high pressure. For example, using the sodium zeolite X referred to above, only 0.8 percent by weight carbon monoxide is adsorbed at 50 millimeters mercury carbon monoxide pressure and 32° F., whereas at 750 millimeters mercury carbon monoxide pressure and 32° F., 5.1 weight percent carbon monoxide is adsorbed.

THus, because of the low temperature and high pressure of the carbon dioxide adsorption zone effluent in the process of the present invention and because of the overall process combination, carbon monoxide removal by adsorption is made economically attractive. Furthermore, the amount of hydrogen adsorbed is very small. This is believed to be primarily because of the extremely low boiling point of hydrogen (−422° F.), as well as the non-polarity of hydrogen, as opposed to carbon monoxide being a polar compound. With a sodium zeolite A (A is meant to designate a synthetic zeolite manufactured by Union Carbide Corporation and described in their U.S. Pat. No. 2,882,243) at 32° F. and 600 millimeters mercury hydrogen pressure, there is essentially no hydrogen adsorption (0.0 weight percent adsorbed) whereas under the same conditions, 5.6 weight percent carbon monoxide is adsorbed.

The adsorbent used in the carbon monoxide adsorption zone is preferably charcoal, a sodium zeolite X, sodium zeolite A, or a silica gel.

adsorbents which are particularly effective for adsorbing carbon monoxide at low temperature and high pressure are, of course, particularly preferred in the process of the present invention, but a wide variety of adsorbents can be used in the process of the present invention. Various molecular sieves which are usually synthetic adsorbents can be used in the process of the present invention. The molecular sieves are crystalline aluminosilicates which usually have undergone heating to remove water of hydration. They possess high porosity with pores or lattice vacancies of uniform size and approximate molecular dimensions. In addition to the use of crystalline aluminosilicate molecular sieves (zeolites), other aluminosilicate material such as clays can be used in the carbon monoxide adsorption step of the present invention. Activated adsorbents such as activated carbons, including activated charcoal, activated alumina, and activated bauxite can be used in the process of the present invention for carbon monoxide adsorption.

In one preferred embodiment of the present invention, further cooling, for example by cryogenic refrigeration, is provided between the carbon dioxide absorption zone and the carbon monoxide adsorption zone to cool the carbon monoxide adsorption zone feed to temperatures as low as minus 200° F. As indicated above, a large improvement in carbon monoxide adsorption is obtained by reducing the temperature.

Although various specific embodiments of the invention have been described and shown, it is to be understood that they are meant to be illustrative only and not limiting. Certain features may be changed without departing from the spirit or essence of the invention. It is apparent that the present invention has broad application to the production of high pressure, high purity hydrogen-rich gas. Accordingly, the invention is not to be constructed as limited to the specific embodiments illustrated but only as defined in the appended claims.

We claim:

1. A process for obtaining high pressure, high purity hydrogen which comprises:

a. generating a hydrogen-rich gas comprising hydrogen, carbon dioxide and carbon monoxide and containing sufficient carbon dioxide so that the molecular weight of the hydrogen-rich gas is at least four, b. centrifugally compressing the hydrogen-rich gas to a pressure above 900 psig to obtain high pressure hydrogen-rich gas, c. removing carbon dioxide from the high pressure hydrogen-rich gas by low temperature absorption of carbon dioxide into a methanol absorbent, which has been cooled to a temperature between 0° F. and 120° F., to obtain low-temperature hydrogen-rich carbon dioxide-lean gas at a temperature between minus 100° F. and 32° F., and d. removing carbon monoxide from the low temperature hydrogen-rich gas by adsorption of carbon monoxide at a temperature below 0° F. to obtain high purity hydrogen gas containing less than 0.01 volume percent carbon monoxide.

2. A process as in claim 1 wherein the low temperature, hydrogen-rich, carbon dioxide-lean gas is cooled to a temperature between minus 200° F. and minus 100° F. prior to removing carbon monoxide by adsorption and wherein the adsorbent used to adsorb carbon monoxide is selected from the group consisting of charcoal, sodium zeolite X, sodium zeolite A, or silica gel.

3. A process as in claim 1 wherein the raw, hydrogen-rich gas is compressed to a pressure between 1,200 and 2,000 psig.

4. A process for obtaining high pressure, high purity hydrogen which comprises:

a. generating a hydrogen-rich gas comprising hydrogen, carbon dioxide and carbon monoxide and containing sufficient carbon dioxide so that the molecular weight of the hydrogen-rich gas is at least four, b. centrifugally compressing the hydrogen-rich gas to a pressure above 900 psig to obtain high pressure hydrogen-rich gas, c. removing carbon dioxide from the high pressure hydrogen-rich gas by lower temperature absorption of carbon dioxide into a methanol absorbent chilled to between 0° F. and minus 120° F. to obtain low-temperature hydrogen-rich carbon dioxide-lean gas at a temperature between minus 100° F. and 32° F., and containing between 0.5 and 4.0 volume percent carbon monoxide, and d. removing carbon monoxide from the low temperature hydrogen-rich gas at a temperature between minus 100° F. and minus 200° F. by carbon monoxide adsorption using a carbon monoxide adsorbent selected from the group consisting of charcoal, sodium zeolite X, sodium zeolite A, or silica gel, to obtain high purity hydrogen gas containing less than 0.01 volume percent carbon monoxide.

5. A process as in claim 4 wherein sufficient carbon monoxide is removed from the hydrogen-rich gas by carbon monoxide adsorption to obtain a high purity hydrogen gas containing less than 0.005 volume percent carbon monoxide.

* * * * *

UNITED STATES PATENT OFFICE
CERTIFICATE OF CORRECTION

Patent No. 3,699,218          Dated October 17, 1972

Inventor(s) Calvin S. Smith and William J. McLeod

It is certified that error appears in the above-identified patent and that said Letters Patent are hereby corrected as shown below:

Col. 1, line 55, "CO +tO $3H_2$" should read --CO + $3H_2$--.

Col. 2, line 56, "low" should read --lower--.

Col. 5, line 52, "2,882,224" should read --2,882,244--.

Col. 5, line 53, "os" should read --is--.

Col. 5, line 66, "THus" should read --Thus--.

Col. 6, line 20, "adsorbents" should read --Adsorbents--.

Col. 6, line 58, "constructed" should read --construed--.

Col. 8, line 8, "lower" should read --low--.

Signed and sealed this 5th day of February 1974.

(SEAL)
Attest:

EDWARD M. FLETCHER, JR.          RENE D. TEGTMEYER
Attesting Officer          Acting Commissioner of Patents